(12) United States Patent
Jeon et al.

(10) Patent No.: US 12,157,448 B2
(45) Date of Patent: Dec. 3, 2024

(54) EMERGENCY BRAKING DEVICE FOR AUTOMOBILE

(71) Applicants: Gwang Seok Jeon, Yongin-si (KR); Woo Young Jeon, Yongin-si (KR)

(72) Inventors: Gwang Seok Jeon, Yongin-si (KR); Woo Young Jeon, Yongin-si (KR)

( * ) Notice: Subject to any disclaimer, the term of this patent is extended or adjusted under 35 U.S.C. 154(b) by 0 days.

(21) Appl. No.: 17/799,786

(22) PCT Filed: Apr. 6, 2021

(86) PCT No.: PCT/KR2021/004247
§ 371 (c)(1),
(2) Date: Aug. 15, 2022

(87) PCT Pub. No.: WO2021/206404
PCT Pub. Date: Oct. 14, 2021

(65) Prior Publication Data
US 2023/0080381 A1    Mar. 16, 2023

(30) Foreign Application Priority Data

Apr. 7, 2020  (KR) .......................... 10-2020-0041983

(51) Int. Cl.
  *B60T 17/04*    (2006.01)
  *B60T 7/04*    (2006.01)
  (Continued)

(52) U.S. Cl.
  CPC .............. *B60T 17/04* (2013.01); *B60T 7/042* (2013.01); *B60T 17/22* (2013.01); *F16K 17/02* (2013.01); *B60Y 2400/306* (2013.01)

(58) Field of Classification Search
  CPC .......... B60T 17/04; B60T 7/042; B60T 17/22; F16K 17/02; B60Y 2400/306
  See application file for complete search history.

(56) References Cited

U.S. PATENT DOCUMENTS

| 11,364,889 B2 * | 6/2022 | Medveded | .............. B60T 17/02 |
| 2014/0251437 A1 * | 9/2014 | Raye | ....................... B60T 17/04 |
| | | | 137/561 R |

(Continued)

FOREIGN PATENT DOCUMENTS

| CN | 204713065 U | * 10/2015 |
| JP | 2020-015477 A | 1/2020 |

(Continued)

*Primary Examiner* — Behrang Badii
*Assistant Examiner* — Jay Khandpur
(74) *Attorney, Agent, or Firm* — KORUS Patent, LLC; Seong Il Jeong

(57) ABSTRACT

An object of the present invention is to provide an emergency braking device for an automobile that is capable of preventing a safety-related accident by applying a braking force even when a brake pipe or the like is ruptured. To this end, the emergency braking device for an automobile of the present invention is an emergency braking device for an automobile that is added to an automobile that is braked by a pressure of main brake fluid transferred through a brake pipe when a brake pedal is stepped on and that is instantaneously and automatically switched to an emergency braking device when braking is not performed due to the rupture of the existing (main) brake pipe, or the like. The emergency braking device for an automobile includes a valve unit, an emergency pipe; a pressing part; and a pressure source.

3 Claims, 8 Drawing Sheets

(51) Int. Cl.
*B60T 17/22* (2006.01)
*F16K 17/02* (2006.01)

(56) References Cited

U.S. PATENT DOCUMENTS

2020/0247437 A1* 8/2020 Selmer .................... B60T 17/18
2021/0129831 A1* 5/2021 Hecker ............... B60W 10/184

FOREIGN PATENT DOCUMENTS

| KR | 10-1998-0001602 A | 3/1998 |
| KR | 20-1998-0013332 U | 6/1998 |
| KR | 20-0120250 Y1 | 7/1998 |
| KR | 10-1998-0046530 A | 9/1998 |
| KR | 20-0135506 Y1 | 3/1999 |
| KR | 10-0187164 B1 | 4/1999 |
| KR | 10-2002-0044764 A | 6/2001 |
| KR | 20-0239456 Y1 | 9/2001 |
| KR | 10-0372720 B1 | 2/2003 |

* cited by examiner

EMERGENCY BRAKING DEVICE FOR AUTOMOBILE

TECHNICAL FIELD

The present invention relates to the braking of an automobile.

BACKGROUND ART

In general, the braking of an automobile refers to controlling the speed of an automobile by the braking torque of a braking device. Braking devices for the above purpose may be classified into hydraulic, pneumatic, and mechanical braking devices according to energy used.

Among them, the hydraulic braking devices include a master cylinder configured to convert the pedaling force of a brake pedal into hydraulic pressure, a brake pipe configured to transmit the resulting hydraulic pressure to wheel sides, a wheel cylinder configured to push a piston with the transferred hydraulic pressure, and a brake pad (or a brake shoe) configured to be brought into contact with a disk (or a drum) by the pushed piston and generate a braking force. Accordingly, when a user steps on the brake pedal, a pressing force, i.e., a pedaling force, is converted into hydraulic pressure through the master cylinder and the resulting hydraulic pressure is transmitted to the wheel cylinder through the brake pipe, so that the piston inside the wheel cylinder is pushed by the hydraulic pressure and brings the pad (or the brake shoe) into close contact with the disk (or the drum), thereby generating a braking force.

Meanwhile, the pneumatic braking systems are based on a braking method of obtaining a braking force using compressed air, and are used in large trucks, buses, etc. The pressure of compressed air generated when a brake pedal is stepped on is transmitted through a brake pipe, and brings a brake pad (or a brake shoe) into close contact with a disc (or a drum) by pushing the brake pad (or the brake shoe), thereby generating a braking force.

However, when the brake pipe or the like is ruptured, such braking devices for an automobile cannot apply a braking force to the disk (or the drum) as the hydraulic pressure (or pneumatic pressure) of the brake pipe or the like is released, thereby causing accidents.

DISCLOSURE

Technical Problem

An object of the present invention is to provide an emergency braking device for an automobile that is capable of preventing a safety-related accident by applying a braking force even when a brake pipe or the like is ruptured.

Technical Solution

In order to accomplish the above object, an embodiment of the present invention provides an emergency braking device for an automobile, the emergency braking device being added to an automobile that is braked by the pressure of main brake fluid transferred through a brake pipe when a brake pedal is stepped on and being used during emergency braking, the emergency braking device including: an emergency pipe filled with emergency brake fluid; a pressing part connected to one end of the emergency pipe, and configured to press the emergency brake fluid during the emergency braking; and a valve unit configured to, when the emergency brake fluid is pressed by the pressing part during the emergency braking, block the main brake fluid and also allow the emergency brake fluid to flow to the rear end of the brake pipe, and to, when normal braking is performed, block the emergency brake fluid and also allow the main brake fluid to flow to the rear end of the brake pipe.

As an example, the pressing part may include: a cylinder connected to one end of the emergency pipe, and filled with the emergency brake fluid to be pressed by a piston; a pressure source connected to the distal end of the piston, and configured to supply high-pressure gas to the piston so that the piston is pressed; a discharge valve provided in the outlet line of the pressure source, and configured to open and close the outlet line; and a switch provided at a position corresponding to the brake pedal, and configured to open the discharge valve while being pressed by the brake pedal when the brake pedal is stepped on deeper than the clearance of the brake pedal due to the leakage of the main brake fluid.

The pressing part may further include a pressure reducing valve provided in the outlet line of the pressure source and configured to reduce the discharge pressure of high-pressure gas discharged from the outlet line of the pressure source.

The pressing part may further include: a pressing sensor configured to sense the pressing of the brake pedal; a pressure sensor configured to sense the internal pressure of the brake pipe; and an alarm configured to guide a user through stepping on the brake pedal deeper by sending a warning signal when the pressure value of the pressure sensor is smaller than a set value in a state in which a pressing signal has been received from the pressing sensor.

The pressing part may further include a valve control part configured to open the discharge valve when the switch is pressed by stepping on the brake pedal deeper.

As another example, the pressing unit may include: a cylinder connected to one end of the emergency pipe, and filled with emergency brake fluid to be pressed by the piston; a pressure source connected to the distal end of the piston, and configured to supply high-pressure gas to the piston so that the piston is pressed; a pressing sensor configured to sense the pressing of the brake pedal; a pressure sensor configured to sense the internal pressure of the brake pipe; a discharge valve provided in the outlet line of the pressure source; and a valve control unit configured to open the discharge valve so that high-pressure gas is discharged when the pressure value of the pressure sensor is smaller than a set value in a state where a pressing signal has been received from the pressing sensor.

The pressure source may be a high-pressure cylinder or high-pressure tank filled with high-pressure gas.

The high-pressure gas may be high-pressure nitrogen or compressed air.

The pressure source may be refilled with the high-pressure gas through a separate high-pressure compressor, or, in the case of a large commercial vehicle, may be refilled with the high-pressure gas through the compressed air generator of the vehicle's own pneumatic braking device.

As an example, the valve unit may include: a check valve provided in the portion of the emergency pipe connected to the brake pipe, and configured to allow only the emergency brake fluid to flow from the emergency pipe to the brake pipe; a valve housing provided on the brake pipe; a pressing pipe configured to connect the emergency pipe and the valve housing and to guide the emergency brake fluid to the valve housing; a valve body movably provided in the valve housing, provided with a through passage, and configured to be placed such that the through passage communicates with the brake pipe in a normal situation, and to be moved and close the brake pipe when emergency brake fluid is introduced by the pressing pipe; and an elastic body provided in the valve housing, and configured to return the valve body to its original position so that the through passage communicates with the brake pipe when emergency brake fluid does not flow into the pressing pipe. In this case, based on the direction in which the main brake fluid flows, the rear end of the emergency pipe may be positioned behind the valve housing.

As another example, the valve unit may include a valve housing provided on the brake pipe, and connected to the emergency pipe; a pressing pipe configured to connect the brake pipe and the valve housing; a valve body movably provided inside the valve housing, provided with a through passage, and configured to be placed such that the through passage communicates with the brake pipe in a normal situation, and to be moved, close the brake pipe and also open the pressing pipe when emergency brake fluid is introduced by the emergency pipe; and an elastic body provided in the valve housing, and configured to, when emergency brake fluid does not flow into the emergency pipe, return the valve body to its original position so that the through passage communicates with the brake pipe and the pressurization pipe is closed by the valve body. In this case, based on the direction in which the main brake fluid flows, the rear end of the pressure pipe may be positioned behind the valve housing.

Advantageous Effects

As described above, the emergency braking device for an automobile according to an embodiment of the present invention may have the following effects:

According to an embodiment, the emergency braking device for an automobile is an emergency braking device for an automobile that is added to an automobile that is normally braked by the pressure of main brake fluid transferred through the brake pipe when the brake pedal is stepped on and that is used during emergency braking. The emergency braking device for an automobile provides a technical configuration including the emergency pipe, the pressing part, and the valve unit. In a state in which the brake pipe is ruptured and thus the main brake fluid is leaking, as the emergency brake fluid is supplied by the pressing part, the main brake fluid is blocked by the valve unit and also the emergency brake fluid is allowed to flow to the rear end of the brake pipe, so that the emergency braking of an automobile can be performed by the pressing of the emergency brake fluid. In a normal state in which the main brake fluid does not leak, the emergency brake fluid is blocked by the valve unit and also the pressure of the main brake fluid is allowed to be transferred to the rear end of the brake pipe, so that the normal braking of the automobile can be performed by the pressing of the main brake fluid. Therefore, even when the brake pipe or the like is ruptured, a safety-related accident can be prevented by applying a braking force to the automobile.

Furthermore, according to an embodiment of the present invention, the pressing part provides a technical configuration, including the cylinder, the pressure supply source, the discharge valve, and the switch, as an example. Accordingly, when a user steps on the brake pedal, the brake pedal is stepped on deeper than the normal clearance due to the leakage of the main brake fluid. As the switch is pressed by the deeply pressed brake pedal, the discharge valve of the pressure source is opened, and the high-pressure gas of the pressure supply source is discharged. As the piston is pushed by the discharged high-pressure gas, the emergency brake fluid of the cylinder may press the emergency brake fluid of the emergency pipe.

Furthermore, according to an embodiment of the present invention, the pressing part provides a technical configuration, including the cylinder, the pressure source, the discharge valve, the switch, the pressing sensor, the pressure sensor, and the alarm, as another example. Accordingly, the internal pressure of the brake pipe is sensed through the pressure sensor in a state where the pressing of the brake pedal has been sensed from the pressing sensor. When the pressure value of the pressure sensor is smaller than a set value, it may be determined that the main brake fluid is leaking, and a user may be guided through stepping on the brake pedal more deeply by sending a warning signal through the alarm. When the user steps on the brake pedal deeper in response to this warning signal, the brake pedal may be stepped on deeper than the normal clearance due to the leakage of the main brake fluid. As the switch is pressed by the deeply pressed brake pedal, the discharge valve is opened, and thus the high-pressure gas is discharged from the pressure source. As the piston is pushed by the discharged high-pressure gas, the emergency brake fluid of the cylinder may press the emergency brake fluid of the emergency pipe.

Furthermore, according to an embodiment of the present invention, the pressing part of the above-described one or another example provides a technical configuration further including the pressure reducing valve. Accordingly, when the discharge valve is opened and thus high-pressure gas is discharged from the pressure source, the gas may be discharged in a pressure state reduced to a set pressure while passing through the pressure reducing valve. In this case, the set pressure may be set according to the weight of the automobile. For example, since the required pressure increases as the weight of the vehicle increases, the set pressure may be determined to be proportional to the required pressure.

Furthermore, according to an embodiment of the present invention, the pressing part of the above-described one or another example provides a technical configuration further including the valve control part. Accordingly, when the switch is pressed by pressing the brake pedal deeper, the valve control part may receive a signal from the switch and perform control so that the discharge valve can be opened. In this case, a solenoid valve that is turned on/off in response to a control signal may be used as the discharge valve.

Furthermore, according to an embodiment of the present invention, the pressing part provides a technical configuration, including the cylinder, the pressure source, the pressing sensor, the pressure sensor, the discharge valve, and the valve control part, as another example. Accordingly, the internal pressure of the brake pipe is sensed through the pressure sensor in a state in which the pressure of the brake pedal has been sensed from the pressure sensor. When the pressure value of the pressure sensor is smaller than a set value, it may be determined that the main brake fluid is leaking, and high-pressure gas may be discharged by opening the discharge valve through the valve control part. As the piston is pushed by the discharged high-pressure gas, the emergency brake fluid of the cylinder may press the emergency brake fluid of the emergency pipe.

Furthermore, according to an embodiment of the present invention, the valve unit provides a technical configuration, including the check valve, the valve housing, the pressing pipe, the valve body, and the elastic body, as an example. Accordingly, the pressing part does not operate in a normal situation in which there is no leakage of the main brake fluid and thus normal braking is possible, so that as the valve body is returned to its original position by the restoring force of the elastic body, the through passage of the valve body communicates with the brake pipe. Furthermore, when a user steps on the brake pedal, the main brake fluid of the brake pipe may apply pressure for normal braking toward the rear end of the brake pipe without flowing to the emergency pipe due to the blockage of the check valve. Meanwhile, when emergency braking is performed due to leakage of the main brake fluid, the emergency brake fluid pressed by the pressing part may apply pressure for emergency braking toward the rear end of the brake pipe through the emergency pipe and the check valve. Also, as part of the emergency brake fluid flows into the valve housing through the emergency pipe and the pressing pipe, it may push up the valve body, and thus the valve body may close the brake pipe such that the emergency brake fluid does not flow backward toward the front end of the brake pipe.

Moreover, according to an embodiment of the present invention, the valve unit provides a technical configuration, including the valve housing, the pressing pipe, the valve body, and the elastic body, as another example. Accordingly, the pressing part does not operate in a normal situation in which there is no leakage of the main brake fluid and thus normal braking is possible, so that as the valve body is returned to its original position by the restoring force of the elastic body, the through passage of the valve body communicates with the brake pipe. Furthermore, when a user steps on the brake pedal, the main brake fluid of the brake pipe may apply pressure for normal braking toward the rear end of the brake pipe without flowing to the emergency pipe due to the blockage of the valve body. Meanwhile, when emergency braking is performed due to leakage of the main brake fluid, the emergency brake fluid pressed by the pressing part may flow into the valve housing through the emergency pipe, may push up the valve body, and may apply pressure for emergency braking toward the rear end of the brake pipe through the pressing pipe. Also, the valve body pushed up so that the emergency brake fluid does not flow backward toward the front end of the brake pipe may close the brake pipe.

MODE FOR INVENTION

Embodiments of the present invention will be described in detail below with reference to the accompanying drawings so that those of ordinary skill in the art to which the present invention pertains can easily implement them. However, the present invention may be embodied in various different forms, and is not limited to the embodiments described herein.

Figure 1:
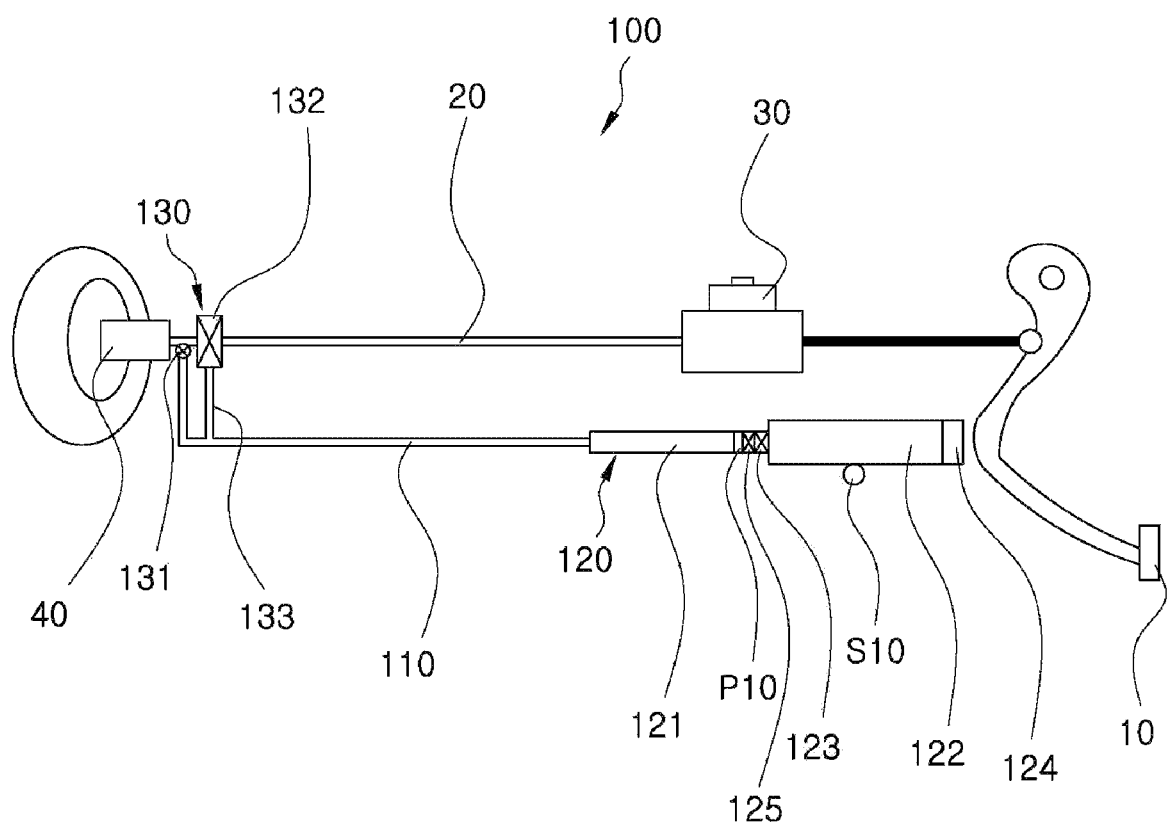
FIG. 1 is a view schematically showing an emergency braking device for an automobile according to a first embodiment of the present invention.
Figure 2:
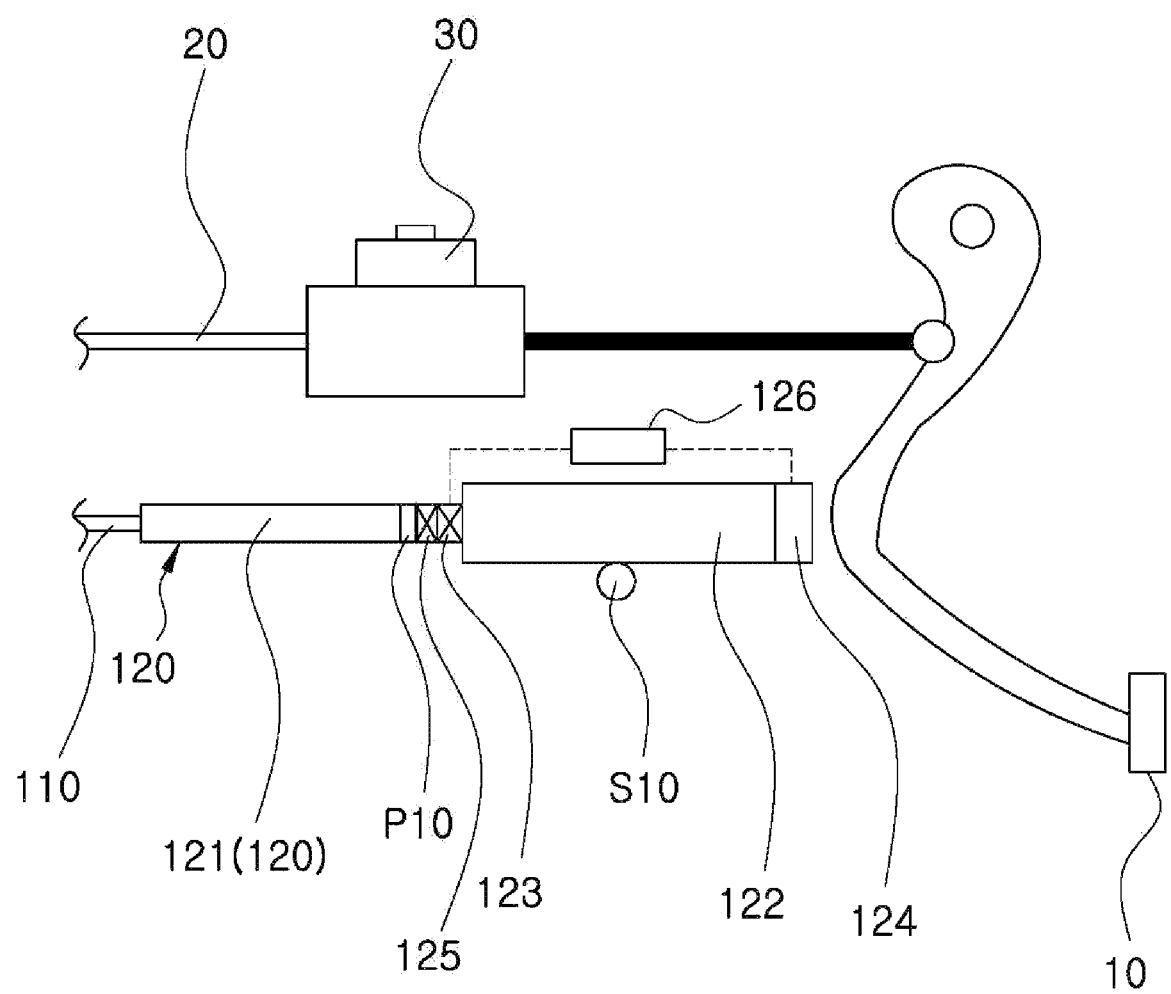
FIG. 2 is a view schematically showing a pressing part in the emergency braking device for an automobile of FIG. 1.
Figure 3:
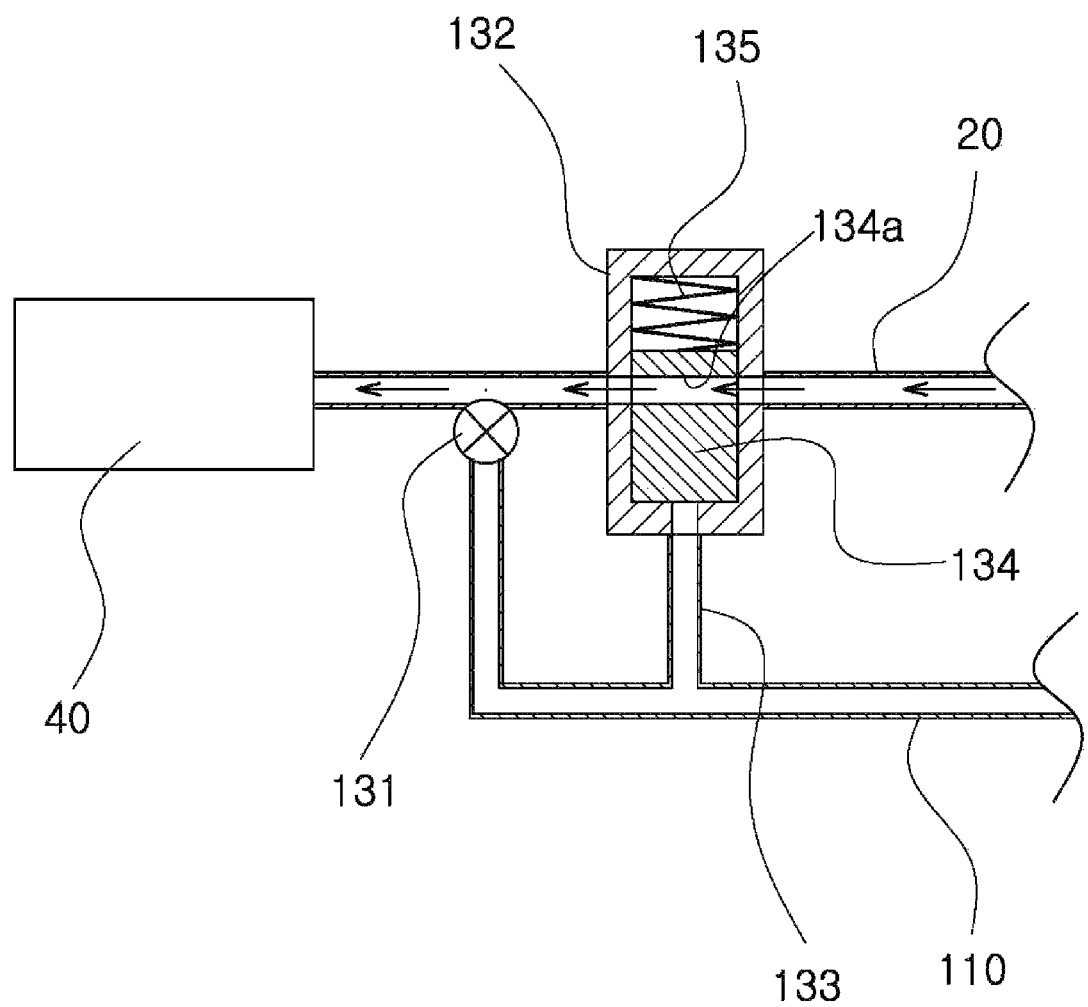
FIG. 3 is a view schematically showing a valve unit in the emergency braking device for an automobile of FIG. 1.
Figure 4:
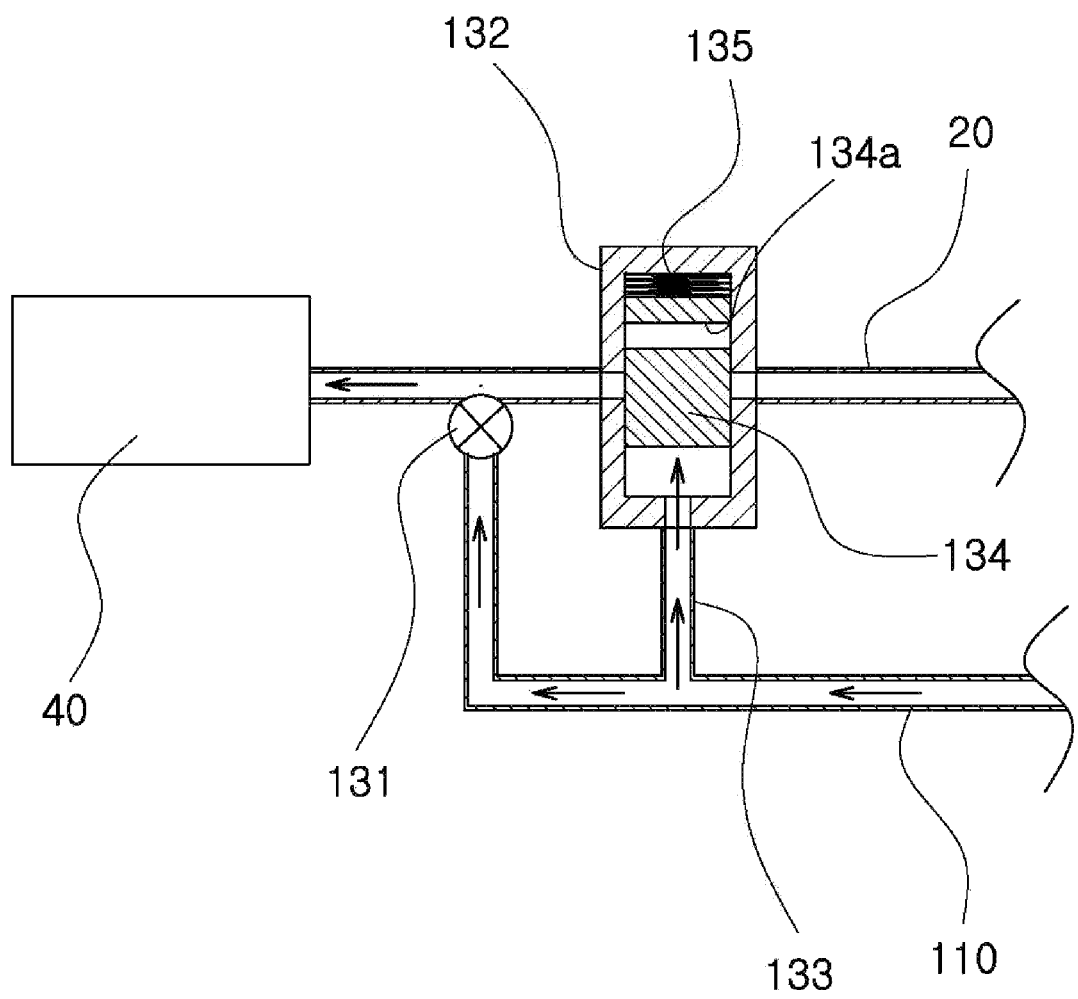
FIG. 4 is a view schematically showing a state in which the valve unit of FIG. 3 is operated during emergency braking.

FIG. 1 is a view schematically showing an emergency braking device for an automobile according to a first embodiment of the present invention, and FIG. 2 is a view schematically showing a pressing part in the emergency braking device for an automobile of FIG. 1. FIG. 3 is a view schematically showing a valve unit in the emergency braking device for an automobile of FIG. 1, and FIG. 4 is a view schematically showing a state in which the valve unit of FIG. 3 is operated during emergency braking.

An emergency braking device 100 for an automobile according to a first embodiment of the present invention is an emergency braking device for an automobile that is added to an automobile that is braked by the pressure of main brake fluid transferred through a brake pipe 20 when a brake pedal 10 is stepped on and that is used during emergency braking, as shown in FIGS. 1 to 4. The emergency braking device 100 for an automobile includes an emergency pipe 110, a pressing part 120, and a valve unit 130. Each of the components will be described in detail below with continuous reference to FIGS. 1 to 4.

The emergency pipe 110 is a component that is filled with emergency brake fluid and that is intended to transmit the pressure of the pressed emergency brake fluid to a wheel cylinder 40 and the like. The emergency pipe 110 may be provided separately from the brake pipe 20 filled with the main brake fluid, as shown in FIG. 1.

The pressing part 120 is a component that is intended to press emergency brake fluid during emergency braking. The pressing part 120 may be connected to one end of the emergency pipe 110, as shown in FIGS. 1 and 2.

The valve unit 130 is a component that performs switching to use only the main brake fluid through the brake pipe 20 during normal braking and to use only the emergency brake fluid through the emergency pipe 110 during emergency braking. The valve unit 130 may be configured to block the main brake fluid and also allow the emergency brake fluid to flow to the rear end of the brake pipe 20 when the emergency brake fluid is pressed by the pressing part 120 during emergency braking (see FIG. 4), and may also be configured to block the emergency brake fluid and also allow the main brake fluid to flow to the rear end of the brake pipe 20 during normal braking (see FIG. 3). Furthermore, the valve unit 130 may be provided between an end of the emergency pipe 110 and the rear end of the brake pipe 20, as shown in FIGS. 1, 3, and 4.

Accordingly, the above-described components are provided. In a state in which the brake pipe 20 is ruptured and thus the main brake fluid is leaking, as the emergency brake fluid is supplied by the pressing part 120, the main brake fluid is blocked by the valve unit 130 and also the emergency brake fluid is allowed to flow to the rear end of the brake pipe 20, so that the emergency braking of an automobile can be performed by the pressing of the emergency brake fluid. In a normal state in which the main brake fluid does not leak, the emergency brake fluid is blocked by the valve unit 130 and also the pressure of the main brake fluid is allowed to be transferred to the rear end of the brake pipe 20, so that the normal braking of the automobile can be performed by the pressing of the main brake fluid. Therefore, even when the brake pipe 20 or the like is ruptured, a safety-related accident can be prevented by applying a braking force to the automobile.

For reference, the reference numeral "30" in FIG. 1 denotes a master cylinder or a component corresponding thereto and should not be limited to the master cylinder, and the reference numeral "40" in FIG. 1 denotes a wheel cylinder or a component corresponding thereto and should not be limited to the wheel cylinder. Furthermore, the reference numeral "S10" in FIG. 1 denotes a pressure gauge capable of checking the pressure of a pressure source.

The pressing part 120 will be described in more detail below with reference to FIGS. 1 and 2.

The pressing part 120 may include a cylinder 121, a pressure source 122, a discharge valve 123, and a switch 124, as shown in FIGS. 1 and 2.

The cylinder 121 may be connected to one end of the emergency pipe 110 and may be filled with emergency brake fluid to be pressed by a piston P10. The pressure source 122 may be connected to the distal end of the piston P10, and may supply high-pressure gas to the piston P10 so that the piston P10 is pressed. For example, the pressure source 122 may be a high-pressure cylinder or high-pressure tank that is filled with high-pressure gas. Furthermore, high-pressure nitrogen, compressed air or the like may be used as the high-pressure gas. Furthermore, the pressure source 122 may be refilled with high-pressure gas through a separate high-pressure compressor (not shown), as an example. As another example, in the case of a large commercial vehicle, the high-pressure gas may be refilled through the compressed air generator (not shown) of a self-pneumatic brake system.

The discharge valve 123 may be provided in the outlet line of the pressure source 122, and may open and close the outlet line of the pressure source 122. The switch 124 may be provided in the pressure source 122 or the like, and may be provided at a position corresponding to the brake pedal 10. When the brake pedal 10 is stepped deeper than the clearance due to leakage of the main brake fluid, the switch 124 may open the discharge valve 123 while being pressed by the brake pedal 10.

Accordingly, when a user steps on the brake pedal 10, the brake pedal 10 is stepped on deeper than the normal clearance due to the leakage of the main brake fluid. As the switch 124 is pressed by the deeply pressed brake pedal 10, the discharge valve of the pressure source 122 is opened, and the high-pressure gas of the pressure supply source 122 is discharged. As the piston P10 is pushed by the discharged high-pressure gas, the emergency brake fluid of the cylinder 121 may press the emergency brake fluid of the emergency pipe 110.

In addition, the pressing part 120 may further include a pressure reducing valve 125, as shown in FIGS. 1 and 2. The pressure reducing valve 125 may be provided in the outlet line of the pressure source 122, and may reduce the discharge pressure of high-pressure gas discharged from the outlet line of the pressure source 122. Accordingly, when the discharge valve 123 is opened and thus high-pressure gas is discharged from the pressure source 122, the gas may be discharged in a pressure state reduced to a set pressure while passing through the pressure reducing valve 125. In this case, the set pressure may be set according to the weight of the automobile. For example, since the required pressure increases as the weight of the vehicle increases, the set pressure may be determined to be proportional to the required pressure.

Furthermore, as shown in FIG. 2, the pressing part 120 may further include a valve control part 126. When the switch 124 is pressed by pressing the brake pedal 10 deeper, the valve control part 126 may receive a signal from the switch 124 and perform control so that the discharge valve 123 can be opened. In this case, a solenoid valve that is turned on/off in response to a control signal may be used as the discharge valve 123.

The valve unit 130 will be described in more detail below with reference to FIGS. 3 and 4.

As shown in FIGS. 3 and 4, the valve unit 130 may include a check valve 131, a valve housing 132, a pressing pipe 133, a valve body 134, and an elastic body 135. The check valve 131 may be provided in the portion of the emergency pipe 110 that is connected to the brake pipe 20, and may only allow the emergency brake fluid to flow from the emergency pipe 110 to the brake pipe 20. The valve housing 132 may be provided on the brake pipe 20. The pressing pipe 133 may connect the emergency pipe 110 and the valve housing 132, and may transfer emergency brake fluid or its pressure to the valve housing 132.

The valve body 134 may be movably provided inside the valve housing 132, and may have a through passage 134*a*. In a normal situation, the valve body 134 may be placed such that the through passage 134*a* can communicate with the brake pipe 20. When the emergency brake fluid is introduced by the pressing pipe 133, the valve body 134 may be moved and close the brake pipe 20. The elastic body 135 may be provided in the valve housing 132, and may return the valve body 134 to its original position so that the through passage 134*a* communicates with the brake pipe 20 when the emergency brake fluid does not flow into the pressing pipe 133. In this case, based on the direction in which the main brake fluid flows, the rear end of the emergency pipe 110 may be positioned behind the valve housing 132.

Accordingly, the pressing part 120 does not operate in a normal situation in which there is no leakage of the main brake fluid and thus normal braking is possible, so that as the valve body 134 is returned to its original position by the restoring force of the elastic body 135, the through passage 134*a* of the valve body 134 communicates with the brake pipe 20, as shown in FIG. 3. Furthermore, when a user steps on the brake pedal 10, the main brake fluid of the brake pipe 20 may apply pressure for normal braking toward the rear end of the brake pipe 20 without flowing to the emergency pipe 110 due to the blockage of the check valve 131. Meanwhile, when emergency braking is performed due to leakage of the main brake fluid, the emergency brake fluid pressed by the pressing part 120 may apply pressure for emergency braking toward the rear end of the brake pipe 20 through the emergency pipe 110 and the check valve 131, as shown in FIG. 4. Also, as part of the emergency brake fluid flows into the valve housing 132 through the emergency pipe 110 and the pressing pipe 133, it may push up the valve body 134, and thus the valve body 134 may close the brake pipe 20 such that the emergency brake fluid does not flow backward toward the front end of the brake pipe 20.

An emergency braking device 200 for an automobile according to a second embodiment of the present invention will be described below with reference to FIG. 5.

Figure 5:
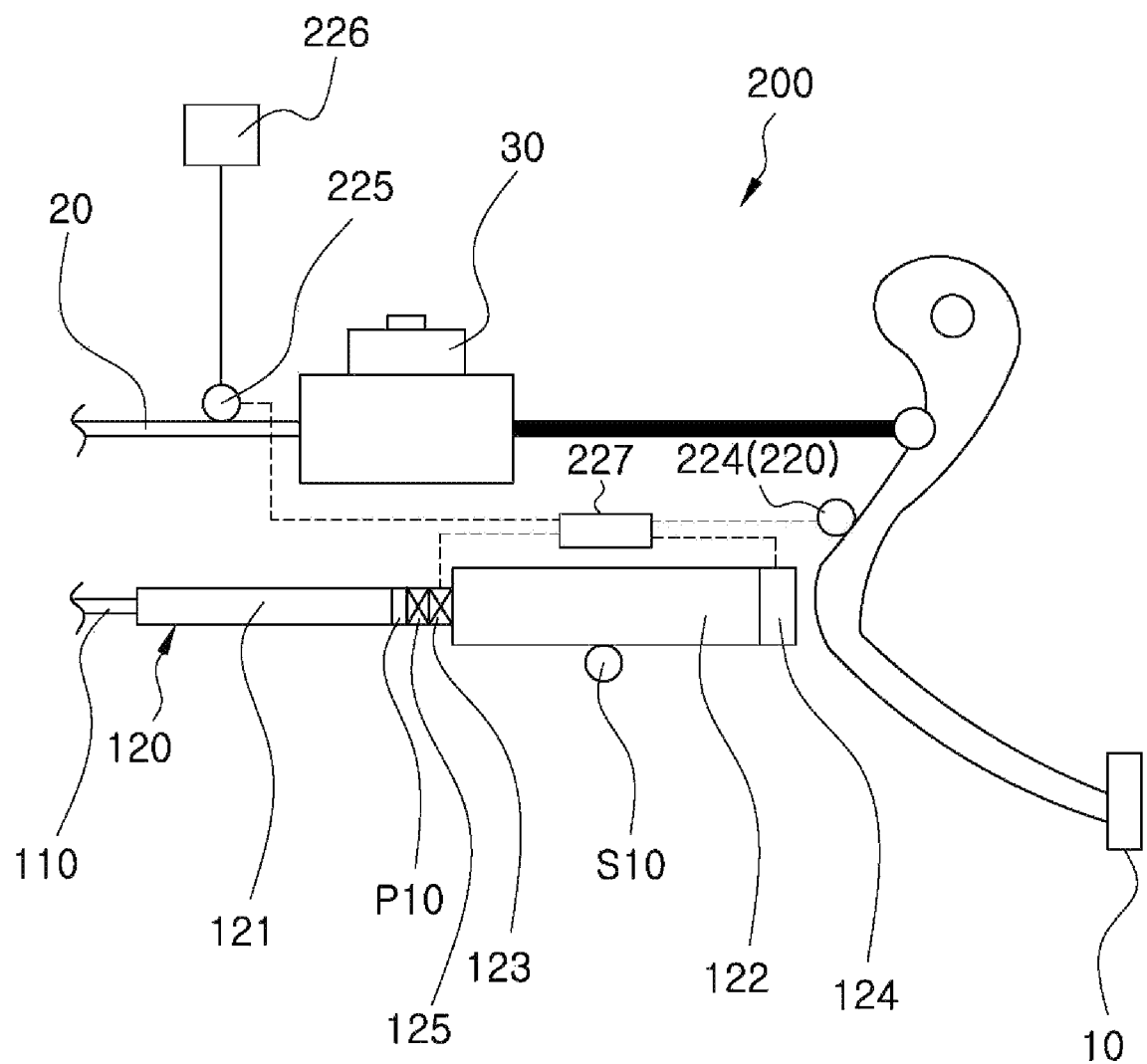
FIG. 5 is a view schematically showing an emergency braking device for an automobile according to a second embodiment of the present invention.

FIG. 5 is a view schematically showing the emergency braking device for an automobile according to the second embodiment of the present invention.

As shown in FIG. 5, the emergency braking device 200 for an automobile according to the second embodiment of the present invention is the same as that of the first embodiment of the present invention described above except that there is provided a pressing part 220 in which a pressing sensor 224, a pressure sensor 225, and an alarm 226 are further included in the pressing part 120 of the first embodiment described above. Accordingly, the following description will be given mainly with a focus on the above difference. For reference, the pressing part 220 described in the second embodiment of the present invention plays the same role as the pressing part 120 described in the above-described first embodiment. In other words, the pressing part 220 serves to push the emergency brake fluid by pressing it during emergency braking.

The pressing sensor 224 may sense the pressing of the brake pedal 10. For example, a conventional sensor for turning on/off a rear light of the automobile may be used as the pressing sensor 224. The pressure sensor 225 may be provided on the brake pipe 20, and may sense the internal pressure of the brake pipe 20. The alarm 226 may guide a user through pressing the brake pedal 10 more deeply by sending a warning signal when the pressure value of the pressure sensor 225 is smaller than a set value.

Accordingly, the internal pressure of the brake pipe 20 is sensed through the pressure sensor 225 in a state where the pressing of the brake pedal 10 has been sensed from the pressing sensor 224. When the pressure value of the pressure sensor 225 is smaller than a set value, it may be determined that the main brake fluid is leaking, and a user may be guided through stepping on the brake pedal 10 more deeply by sending a warning signal through the alarm 226. When the user steps on the brake pedal 10 deeper in response to this warning signal, the brake pedal 10 may be stepped on deeper than the normal clearance due to the leakage of the main brake fluid. As the switch 124 is pressed by the deeply pressed brake pedal 10, the discharge valve 123 is opened, and thus the high-pressure gas is discharged from the pressure source 122. As the piston P10 is pushed by the discharged high-pressure gas, the emergency brake fluid of the cylinder 121 may press the emergency brake fluid of the emergency pipe 110.

In addition, the pressing part 220 may further include a valve control part 227, as shown in FIG. 5. The valve control part 227 may open the discharge valve 123 so that high-pressure gas can be discharged when the pressure value of the pressure sensor 225 is smaller than a set value in a state in which a pressing signal has been received from the pressing sensor 224.

An emergency braking device 300 for an automobile according to a third embodiment of the present invention will be described below with reference to FIG. 6.

Figure 6:
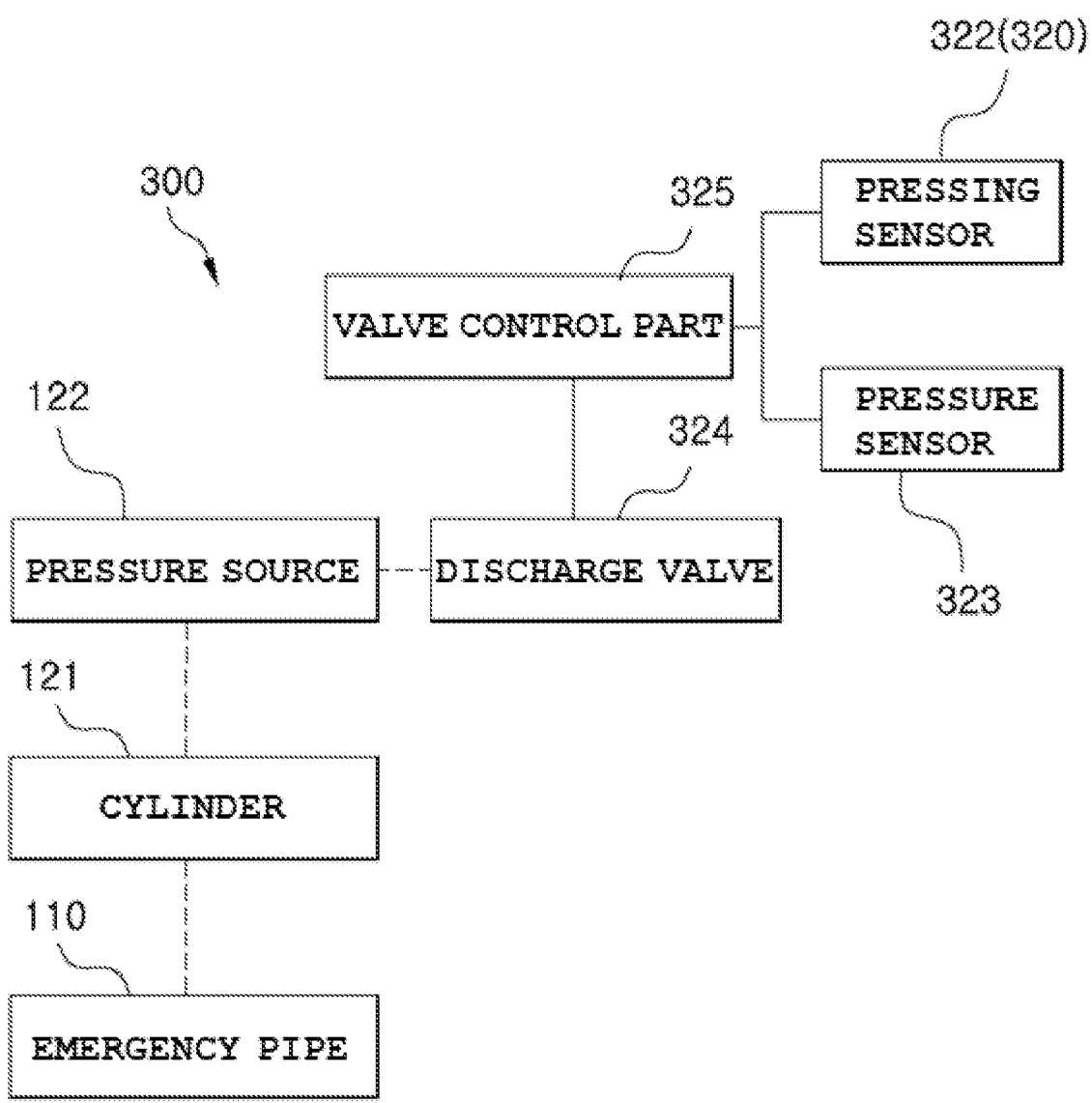
FIG. 6 is a view schematically showing an emergency braking device for an automobile according to a third embodiment of the present invention.

FIG. 6 is a view schematically showing the emergency braking device for an automobile according to the third embodiment of the present invention.

As shown in FIG. 6, the emergency braking device for an automobile according to the third embodiment of the present invention is the same as that of the first embodiment of the present invention described above except for a pressing part 320. Accordingly, the following description will be given with a focus on this difference As shown in FIGS. 2 and 6, the pressing part 320 is a component for pressing emergency brake fluid during emergency braking, and may include a cylinder 121, a pressure source 122, a pressing sensor 322, a pressure sensor 323, a discharge valve 324, and a valve control part 325. The cylinder 121 may be connected to one end of the emergency pipe 110, and may be filled with emergency brake fluid to be pressed by the piston P10. The pressure source 122 may be connected to the distal end of the piston P10, and may supply high-pressure gas to the piston P10 so that the piston P10 can be pressed. Furthermore, a more detailed description of the pressure source 122 is omitted because it is the same as the pressure source described in the first embodiment of the present invention.

The pressing sensor 322 may sense the pressing of the brake pedal 10. For example, a conventional sensor for turning on/off a rear light of an automobile may be used as the pressing sensor 322. The pressure sensor 323 may be provided in the brake pipe 20, and may sense the internal pressure of the brake pipe 20. The discharge valve 324 may be provided in the outlet line of the pressure source 122 to open and close the outlet of the pressure source 122. The valve control part 325 may open the movable valve 324 so that high-pressure gas can be discharged when the pressure value of the pressure sensor 323 is smaller than a set value in a state where a pressing signal has been received from the pressing sensor 322.

Accordingly, the internal pressure of the brake pipe 20 is sensed through the pressure sensor 323 in a state in which the pressure of the brake pedal 10 has been sensed from the pressing sensor 322. When the pressure value of the pressure sensor 323 is smaller than a set value, it may be determined that the main brake fluid is leaking, and high-pressure gas may be discharged by opening the discharge valve 324 through the valve control part 325. As the piston P10 is pushed by the discharged high-pressure gas, the emergency brake fluid of the cylinder 121 may press the emergency brake fluid of the emergency pipe 110.

An emergency braking device 400 for an automobile according to a fourth embodiment of the present invention will be described below with reference to FIGS. 7 and 8.

Figure 7:
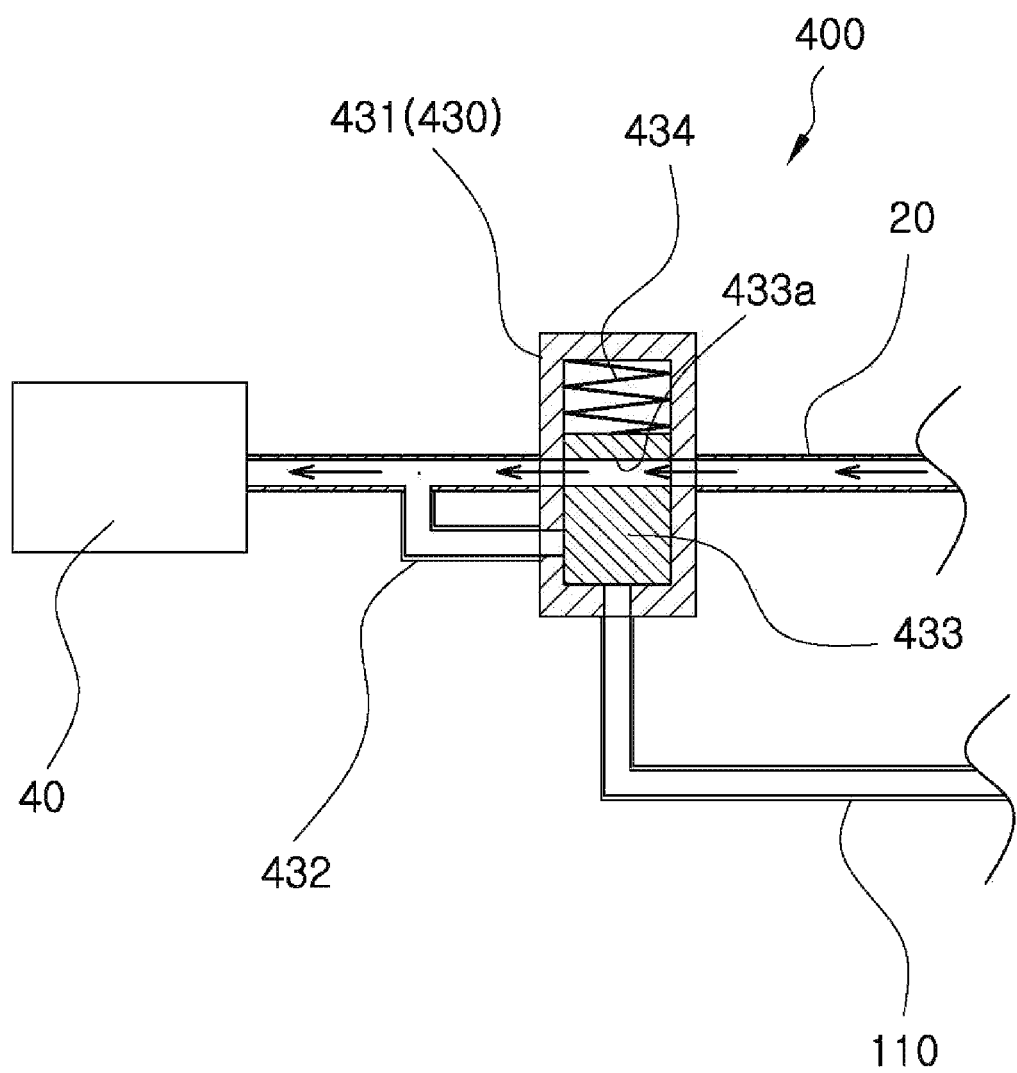
FIG. 7 is a view schematically showing an emergency braking device for an automobile according to a fourth embodiment of the present invention.
Figure 8:
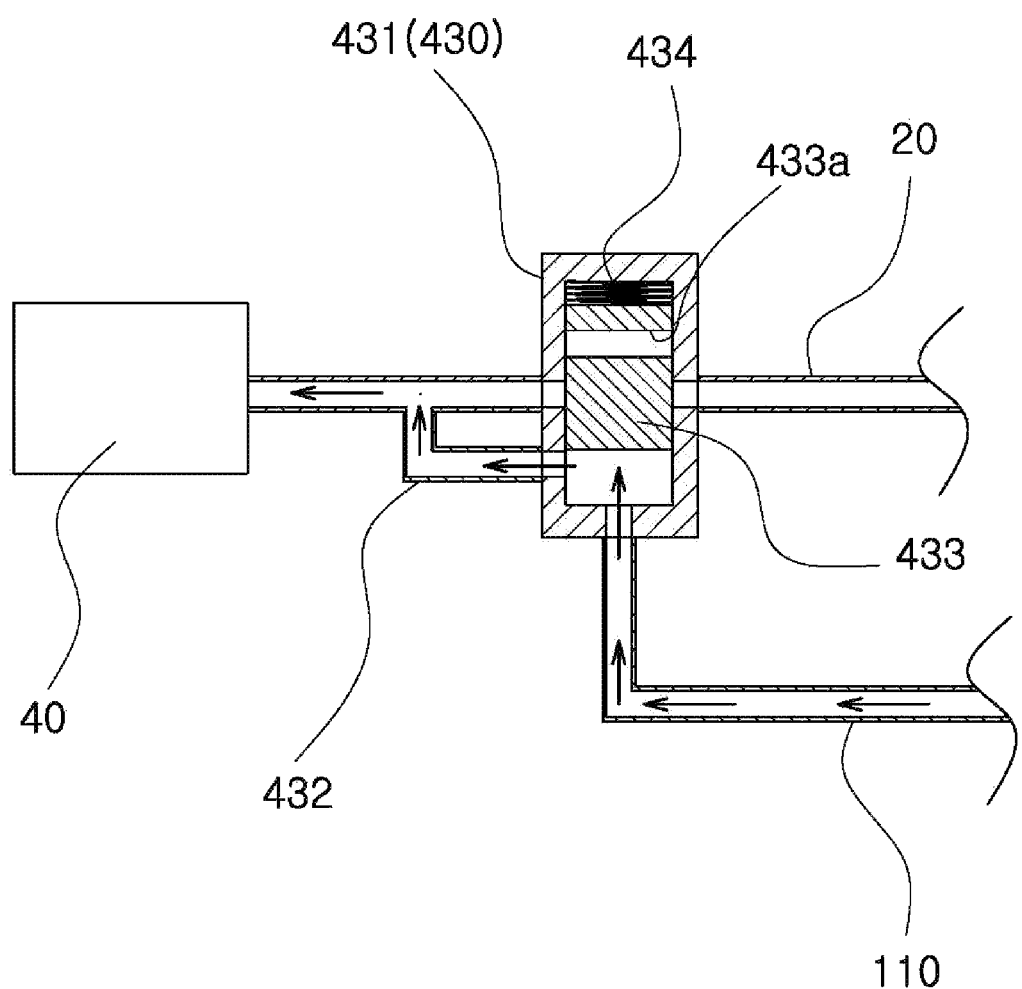
FIG. 8 is a view schematically showing the emergency braking state of the emergency braking device for an automobile of FIG. 7.

FIG. 7 is a view schematically showing the emergency braking device for an automobile according to the fourth embodiment of the present invention, and FIG. 8 is a view schematically showing the emergency braking state of the emergency braking device for an automobile of FIG. 7.

The emergency braking device 400 for an automobile according to the fourth embodiment of the present invention is the same as that of any one of the first, second, and third embodiments except for a valve unit 430, as shown in FIGS. 7 and 8. Accordingly, the following description will be given with a focus on this difference.

As shown in FIGS. 7 and 8, the valve unit 430 may include a valve housing 431, a pressing pipe 432, a valve body 433, and an elastic body 434. The valve housing 431 may be provided on the brake pipe 20, and the emergency pipe 110 may be connected thereto. The pressing pipe 432 may connect between the brake pipe 20 and the valve housing 431. The valve body 433 may be movably provided inside the valve housing 431, and may have a through passage 433a. In a normal situation, the valve body 433 may be placed such that the through passage can communicate with the brake pipe 20 in normal times. When the emergency brake fluid is introduced through the emergency pipe 110, the valve body 433 may be moved, and may close the brake pipe 20 and open the pressing pipe 432. The elastic body 434 may be provided in the valve housing 431. When the emergency brake fluid does not flow into the emergency pipe 110, the through passage 433a may be allowed to communicate with the brake pipe 20, and also the valve body 433 may be returned to its original position so that the pressing pipe 432 can be closed by the valve body 433. In this case, based on the direction in which the main brake fluid flows, the rear end of the pressing pipe 432 may be positioned behind the valve housing 431.

Accordingly, the pressing part 120 does not operate in a normal situation in which there is no leakage of the main brake fluid and thus normal braking is possible, so that as the valve body 433 is returned to its original position by the restoring force of the elastic body 434, the through passage 433a of the valve body 433 communicates with the brake pipe 20, as shown in FIG. 7. Furthermore, when a user steps on the brake pedal 10, the main brake fluid of the brake pipe 20 may apply pressure for normal braking toward the rear end of the brake pipe 20 without flowing to the emergency pipe 110 due to the blockage of the valve body 433. Meanwhile, when emergency braking is performed due to leakage of the main brake fluid, the emergency brake fluid pressed by the pressing part 120 may flow into the valve housing 431 through the emergency pipe 110, may push up the valve body 433, and may apply pressure for emergency braking toward the rear end of the brake pipe 20 through the pressing pipe 432, as shown in FIG. 8. Also, the valve body 433 pushed up so that the emergency brake fluid does not flow backward toward the front end of the brake pipe 20 may close the brake pipe 20.

Although the preferred embodiments of the present invention have been described in detail above, the scope of the present invention is not limited thereto. Various modifications and improvements made by those of ordinary skill using the basic concept of the present invention defined in the following claims also fall within the scope of the present invention.

INDUSTRIAL APPLICABILITY

The present invention relates to the braking of an automobile, and has industrial applicability.

The invention claimed is:

1. An emergency braking device for an automobile, the emergency braking device being added to an automobile that is braked by a pressure of main brake fluid transferred through a brake pipe when a brake pedal is stepped on and being used during emergency braking, the emergency braking device comprising:
an emergency pipe filled with emergency brake fluid;
a pressing part connected to one end of the emergency pipe, and configured to press the emergency brake fluid during the emergency braking; and
a valve unit configured to, when the emergency brake fluid is pressed by the pressing part during the emergency braking, block the main brake fluid and also allow the emergency brake fluid to flow to a rear end of the brake pipe, and to, when normal braking is performed, block the emergency brake fluid and also allow the main brake fluid to flow to the rear end of the brake pipe,
wherein the pressing part comprises:
a pressing sensor configured to sense a pressing of the brake pedal;
a pressure sensor configured to sense an internal pressure of the brake pipe; and
an alarm configured to guide a user through stepping on the brake pedal deeper by sending a warning signal when a pressure value of the pressure sensor is smaller than a set value in a state in which a pressing signal has been received from the pressing sensor.

2. The emergency braking device of claim 1, wherein the pressing part comprises:
a cylinder connected to one end of the emergency pipe, and filled with the emergency brake fluid to be pressed by a piston;
a pressure source connected to a distal end of the piston, and configured to supply high-pressure gas to the piston so that the piston is pressed;
a discharge valve provided in an outlet line of the pressure source, and configured to open and close the outlet line; and
a switch provided at a position corresponding to the brake pedal, and configured to open the discharge valve while being pressed by the brake pedal when the brake pedal is stepped on deeper than a clearance of the brake pedal due to a leakage of the main brake fluid.

3. The emergency braking device of claim 2, wherein the pressing part further comprises a pressure reducing valve provided in the outlet line of the pressure source and configured to reduce a discharge pressure of high-pressure gas discharged from the outlet line of the pressure source.

* * * * *